3,543,182
INFRARED LASER WITH CONCENTRIC
ELECTRODES
Wilhelmus Jacobus Witteman, Gerrit van der Goot, and
Hendrik Bessel Bart van Dam, Emmasingel, Eindhoven,
Netherlands, assignors, by mesne assignments, to U.S.
Philips Corporation, New York, N.Y., a corporation
of Delaware
Filed May 20, 1968, Ser. No. 730,521
Claims priority, application Netherlands, June 1, 1967,
6707615
Int. Cl. H01s 3/22
U.S. Cl. 331—94.5                                    6 Claims

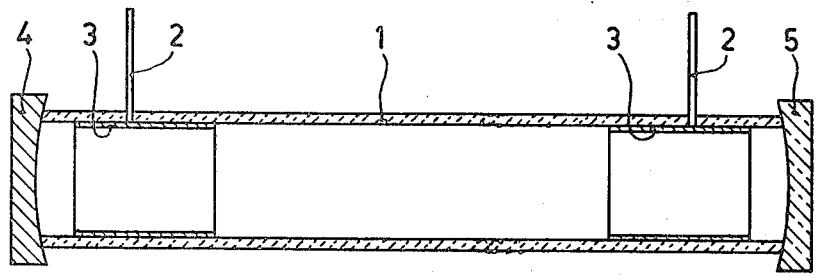

ABSTRACT OF THE DISCLOSURE

An infrared laser having a discharge space filled with a gaseous mixture including carbon dioxide is provided with electrodes mounted concentrically at opposite ends of the internal wall of the discharge tube.

---

The invention relates to a device for producing stimulated infrared emission, an iraser, by means of an electric direct-current discharge in a gas mixture consisting partly of carbon dioxide.

With the irasers operating at higher powers (a few tens to 150 w.) as previously known, the electrodes are disposed in lateral extensions of the discharge tube. This arrangement has the drawback of low efficiency because the discharge portion in the lateral extensions does not contribute to the stimulated emission. Moreover, the deflection of the discharge plasma results in the stimulated beam being slightly disturbed. Such a construction is also comparatively expensive and complicated.

The invention has for its object to provide an improved device.

In a device for producing stimulated infrared emission, an iraser, by means of an electric direct-current discharge in a gas mixture consisting partly of carbon dioxide, according to the invention, the electrodes consist of metal foils which are clamped on the inner wall of the discharge space and are in contact with the current supply conductor.

The solution proposed provides a very simple construction. Rolled-up metal foils are slipped into the discharge tubes and are then released so that they are clamped on the wall at the area of the current supply conductor. Any exchange can then be carried out in a comparatively simple manner, especially if less rigid materials, such as nickel, are used. In the latter case, according to the invention, the electrodes may preferably have a length which is twice or three times their diameter so that a smaller quantity of disintegrated metal will be deposited on the tube.

The invention will now be described more fully with reference to the drawing, which shows a discharge tube for an iraser according to the invention.

Two lead-in wires 2 are sealed in the dimensionally uniform quartz tube 1. Nickel cylinders 3 contacting the wires 2 are clamped on the wall 1. The tube 1 is closed by means of a metal mirror 4 and a geramanium window 5.

What is claimed is:

1. A device for producing stimulated infrared emission comprising an enclosed discharge space containing a gas mixture consisting partly of carbon dioxide, means for producing an electric direct-current discharge in said space, said means including electrodes of metal foil clamped in the discharge space on the inner wall of the discharge space and in contact with a current supply conductor.

2. A device as claimed in claim 1 wherein the length of the electrodes is twice their diameter, said electrodes being composed of nickel.

3. A device as claimed in claim 1 wherein the length of the electrodes is three times their diameter, said electrodes being composed of nickel.

4. A device for producing stimulated infrared emission comprising a uniform tube enclosing a discharge space containing a gas mixture, said tube terminated at one end by an optical mirror and at the other end by a germanium window, means for producing an electric direct current discharge in said discharge space, said means including first and second metallic foil electrodes in the discharge space concentric with and clamped to the inner wall of said tube, and conductor means for supplying current being provided in contact with each electrode through the wall of said tube.

5. A device as claimed in claim 4 wherein the length of the electrodes is twice their diameter, said electrodes being composed of nickel.

6. A device as claimed in claim 4 wherein the length of the electrodes is three times their diameter, said electrodes being composed of nickel.

References Cited

UNITED STATES PATENTS 3,411,105  11/1968  Patel _____ 331—94.5
3,447,098  5/1969   Eckberg _____ 331—94.5

RAYMOND F. HOSSFELD, Primary Examiner

U.S. Cl. X.R.

313—217, 218